United States Patent
Ramirez Flores et al.

(10) Patent No.: US 9,503,705 B2
(45) Date of Patent: Nov. 22, 2016

(54) STEREOSCOPIC IMAGE GENERATION

(71) Applicant: LENOVO (Singapore) PTE, LTD., New Tech Park (SG)

(72) Inventors: Axel Ramirez Flores, Cary, NC (US); Bruce Douglas Gress, Raleigh, NC (US); Robert James Kapinos, Durham, NC (US); Alfredo Zugasti Hays, Cary, NC (US); Jose Rodolfo Ruiz, Raleigh, NC (US)

(73) Assignee: Lenovo (Singapore) PTE. LTD., New Tech Park (SG)

(*) Notice: Subject to any disclaimer, the term of this patent is extended or adjusted under 35 U.S.C. 154(b) by 240 days.

(21) Appl. No.: 14/104,848

(22) Filed: Dec. 12, 2013

(65) Prior Publication Data
US 2015/0172632 A1 Jun. 18, 2015

(51) Int. Cl.
 *H04N 13/04* (2006.01)
 *H04N 13/02* (2006.01)

(52) U.S. Cl.
 CPC ...... *H04N 13/0225* (2013.01); *H04N 13/0235* (2013.01)

(58) Field of Classification Search
 CPC ......... G02B 27/2214; H04N 13/0239; H04N 13/0497
 USPC ................... 348/49, 51, 54, 42–48
 See application file for complete search history.

(56) References Cited

U.S. PATENT DOCUMENTS

| 6,762,794 B1 * | 7/2004 | Ogino ............ G06T 7/0022 348/262 |
| 6,924,948 B2 | 8/2005 | Oshima et al. |
| 6,992,699 B1 | 1/2006 | Vance et al. |
| 7,432,977 B2 | 10/2008 | Chiang |
| 8,368,808 B2 | 2/2013 | Zhang |
| 2004/0125447 A1 * | 7/2004 | Sato ............ G02B 27/22 359/462 |
| 2008/0079805 A1 * | 4/2008 | Takagi ............ H04N 13/0018 348/51 |
| 2009/0122179 A1 | 5/2009 | Nomura et al. |
| 2011/0033170 A1 * | 2/2011 | Ikeda ............ G11B 27/034 386/244 |
| 2011/0249888 A1 * | 10/2011 | Caceres ............ G11B 15/605 382/154 |
| 2012/0236123 A1 * | 9/2012 | Chen ............ H04N 13/0239 348/47 |
| 2012/0327196 A1 * | 12/2012 | Ohba ............ G06K 9/00281 348/49 |
| 2013/0113901 A1 * | 5/2013 | Mori ............ G03B 35/16 348/54 |
| 2013/0300737 A1 * | 11/2013 | Nishino ............ A61B 6/022 345/419 |
| 2015/0220150 A1 * | 8/2015 | Plagemann ............ G06F 3/017 715/856 |

OTHER PUBLICATIONS

U.S. Appl. No. 14/943,525 Office Action Summary, Mar. 29, 2016.

* cited by examiner

*Primary Examiner* — Thai Tran
*Assistant Examiner* — Mishawn Hunter
(74) *Attorney, Agent, or Firm* — Kunzler Law Group

(57) ABSTRACT

For generating a stereoscopic image, a first parallax optical element directs a first parallax image to an optical selector. A second parallax optical element directs a second parallax image to the optical selector. The optical selector alternates between directing the first parallax image and the second parallax image to a video camera.

20 Claims, 8 Drawing Sheets

STEREOSCOPIC IMAGE GENERATION

BACKGROUND

Field

The subject matter disclosed herein relates to stereoscopic images and more particularly relates to a stereoscopic image generation.

Description of the Related Art

Electronic devices often include video cameras. However, the video cameras do not provide stereoscopic images.

BRIEF SUMMARY

A system for stereoscopic image generation is disclosed. The system includes a video camera, a first parallax optical element, a second parallax optical element, and an optical selector. The first parallax optical element directs a first parallax image to the optical selector. The second parallax optical element directs a second parallax image to the optical selector. The optical selector alternates between directing the first parallax image and the second parallax image to the video camera. A method and apparatus also perform the functions of the system.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
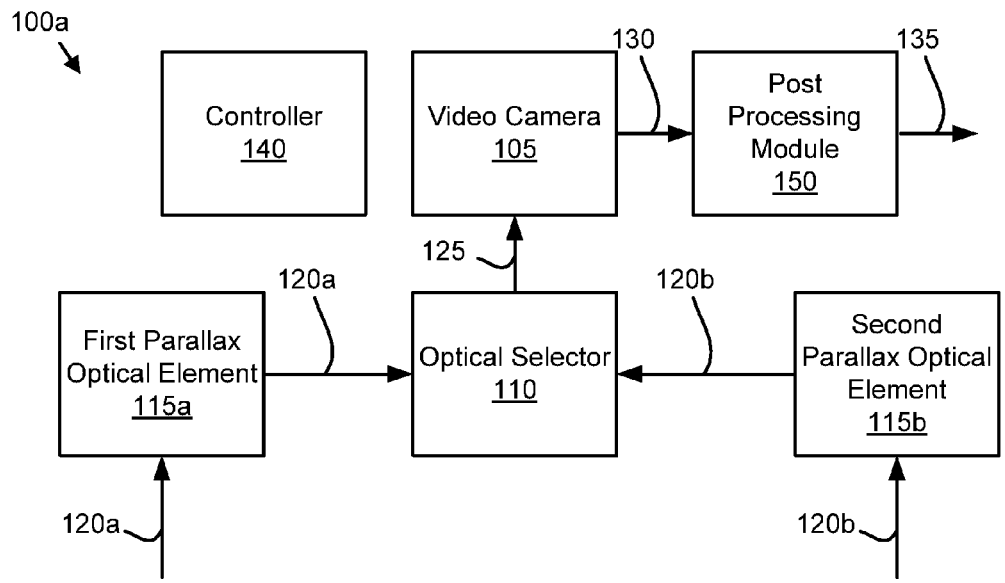
FIG. 1A is a schematic block diagram illustrating one embodiment of an optical selector system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

Descriptions of Figures may refer to elements described in previous Figures, like numbers referring to like elements.

FIG. 1A is a schematic block diagram illustrating one embodiment of an optical selector system 100*a*. The system 100*a* includes a video camera 105, a post processing module 150, one or more parallax optical elements 115, an optical selector 110, and a controller 140. The parallax optical elements 115 each direct a parallax image 120 to the optical selector 110. The optical selector 110 alternates between directing each of the parallax images 120 to the video camera 105 as a synchronized parallax image stream 125.

In the past, stereoscopic cameras included at least two video cameras 105. Each video camera 105 was typically mounted to receive a parallax image relative to the other video camera 105. The video cameras 105 then digitized the video images and generated two video streams. The video streams were then merged into a single synchronized parallax video stream that could be used to generate a stereoscopic image.

Unfortunately, employing two video cameras 105 is significantly more expensive than employing a single video camera 105. In addition, two video cameras require additional power buses, data buses, and space, making providing a stereoscopic camera significantly more expensive than providing only a video camera 105. Because of the requirement for multiple cameras, stereoscopic cameras are also difficult to include in small electronic devices.

The embodiments described herein provide an optical selector 110 that alternates between directing a first parallax image from the first parallax optical element 115a and the second parallax image from the second parallax optical element 115b to the video camera 105 as will be described hereafter. As a result, the single video camera 105 generates a stereoscopic image stream 130 with synchronized and interleaved first and second parallax images 120a-b.

Each parallax optical element 115 is disposed to receive a parallax image 120 of a scene. In the depicted embodiment, the parallax optical elements 115 include a first parallax optical element 115a and a second parallax optical element 115b.

The parallax optical elements 115 direct the parallax images 120 to the optical selector 110. The parallax optical elements 115 may include one or more of lenses, mirrors, and/or flat lenses. The parallax optical elements 115 may receive the parallax images 120 and redirect the parallax images 120 to the optical selector 110. The parallax images 120 may be directed through one or more of an air channel, a light pipe, a refractive lens, a mirror, and a flat lens.

The optical selector 110 alternates between directing each parallax image 120 to the video camera 105. The video camera 105 may receive the first parallax image 120a and the second parallax image 120b as a synchronized parallax image stream 125 and generate a stereoscopic image stream 130 that is communicated to the post processing module 150. The video camera 105 may be a charge-coupled device (CCD) video camera, an active-pixel sensor (APS) video camera, and/or a reflective infrared (IR) video camera.

In one embodiment, the video camera 105 may have a variable focal length. In addition, the video camera 105 may comprise an active emitter. In a certain embodiment, the video camera 105 supports dekeystoning. For example, the video camera 105 may comprise an adjustable mirror that dekeystones images received by the video camera 105.

The post processing module 150 may generate a processed stereoscopic image stream 135 from the stereoscopic image stream 130. The post processing module 150 may perform a post-processing function to process the stereoscopic image stream 130 and generate the processed stereoscopic image stream 135. The processed stereoscopic image stream 135 may be encoded with H.264/AVC simulcast format, H.264/AVC stereo SEI message format, H.264/MVC format, or the like. In one embodiment, the post processing module 150 is embodied in the video camera 105.

In one embodiment, the post-processing function separates the first parallax images 120a into a first parallax stream and the second parallax images 120b into a second parallax stream. Alternatively, the post-processing function may save the first parallax image 120a and the second parallax image 120b for subsequent processing.

In one embodiment, the post-processing function compresses the first parallax image 120a and the second parallax image 120b. Alternatively, the post-processing function may convert the first parallax image 120a and the second parallax image 120b into an alternate color space.

The controller 140 may control the optical selector 110, directing the optical selector 110 to alternate between directing each of the parallax images 120 to the video camera 105 as a synchronized parallax image stream 125. The controller 140 may include a processor such as a sequencer and a memory such as a computer readable storage medium. The controller 140 may generate one or more signals to control the functions of the optical selector 110. The system 100 may produce a stereoscopic image for significantly less cost than using two video cameras 105 disposed to generate parallax images.

Figure 1B:
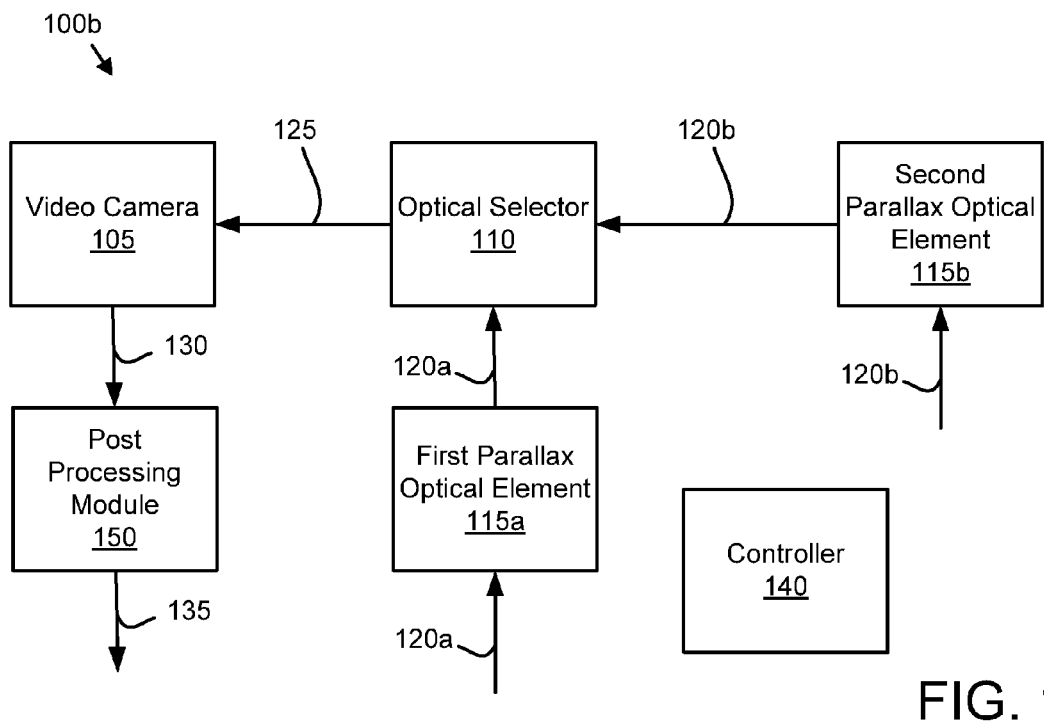
FIG. 1B is a schematic block diagram illustrating one alternate embodiment of an optical selector system.

FIG. 1B is a schematic block diagram illustrating one alternate embodiment of an optical selector system 100b. The system 100b is an alternate configuration of the system 100a of FIG. 1A. In the depicted embodiment, the optical selector 110 passes the second parallax image 120b through to form the synchronized parallax image stream 125 while redirecting the first parallax image 120a to form the synchronized parallax image stream 125.

Figure 2A:
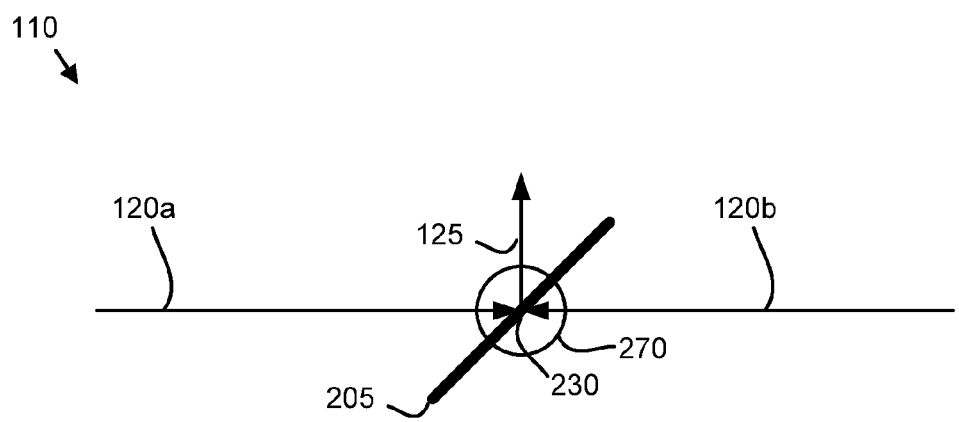
FIG. 2A is a schematic diagram illustrating one embodiment of a mirror optical selector.

FIG. 2A is a schematic diagram illustrating one embodiment of a mirror optical selector 110. The mirror optical selector 110 may be the optical selector 110 of FIGS. 1A-B. The mirror optical selector 110 includes a mirror 205 that rotates about a pivot 230. In the depicted embodiment, the mirror 205 is positioned to reflect the first parallax image 120a from the first parallax optical element 115a to form the synchronized parallax image stream 125 that is directed to the video camera 105. As positioned, the mirror 205 does not reflect the second parallax image 120b from the second parallax optical element 115b to form the synchronized parallax image stream 125.

In one embodiment, an actuator 270 motivates the mirror 205 to rotate about the pivot 230. The actuator 270 may be an electric motor, a stepper motor, a linear motor, or the like. The controller 140 may control the actuator 270.

Figure 2B:
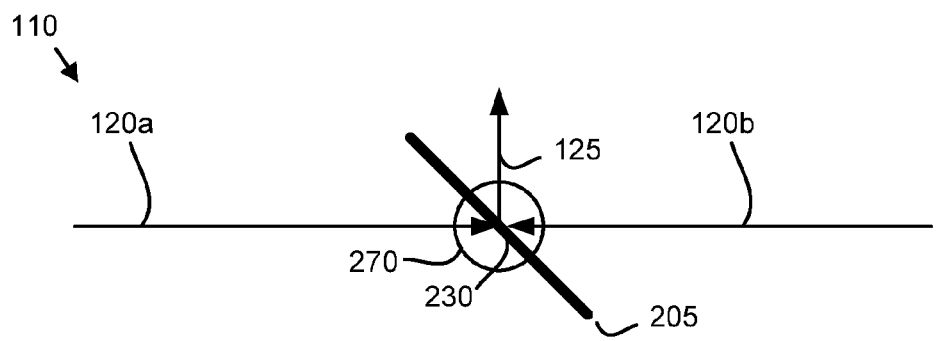
FIG. 2B is a schematic diagram illustrating one alternate embodiment of a mirror optical selector.

FIG. 2B is a schematic diagram illustrating one alternate embodiment of the mirror optical selector 110 of FIG. 2A. In the depicted embodiment, the mirror 205 is repositioned to reflect the second parallax image 120b from the second parallax optical element 115b to form the synchronized parallax image stream 125 that is directed to the video camera 105. The mirror 205 does not reflect the first parallax image 120a from the first parallax optical element 115a to form the synchronized parallax image stream 125. The actuator 270 may reposition the mirror 205 as directed by the controller 140.

Figure 3A:
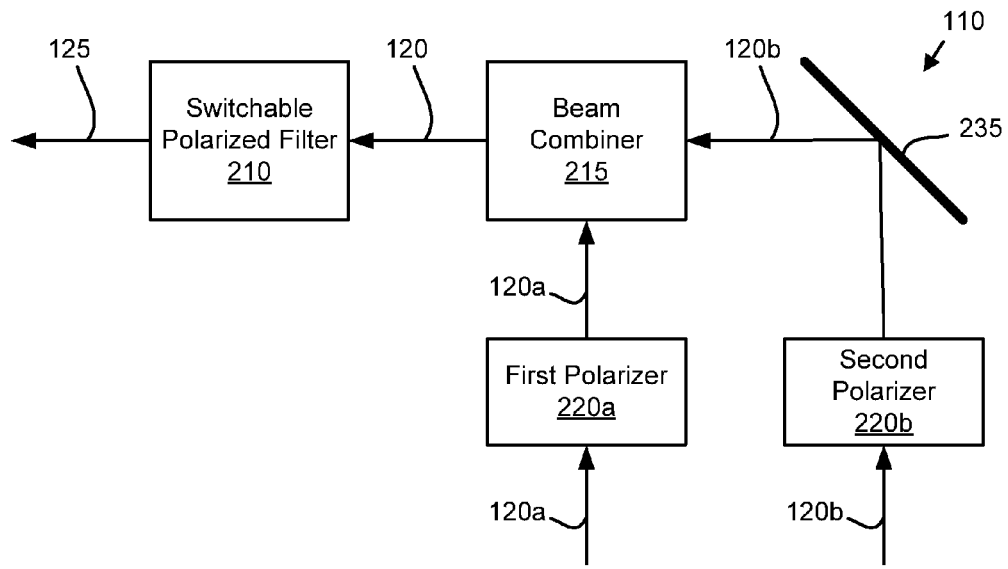
FIG. 3A is a schematic block diagram illustrating one embodiment of a switchable polarized filter optical selector.

FIG. 3A is a schematic block diagram illustrating one embodiment of a switchable polarized filter optical selector 110. The switchable polarized filter optical selector 110 implements the optical selector 110 of FIGS. 1A-B. In the depicted embodiment, the switchable polarized filter optical selector 110 includes a switchable polarized filter 210, a beam combiner 215, a fixed mirror 235, and one or more polarizers 220. In the depicted embodiment, the polarizers 220 include a first polarizer 220a and a second polarizer 220b.

The first polarizer 220a receives the first parallax image 120a from the first parallax optical element 115a and polarizes the first parallax image 120a with a first optical polarization. The first optical polarization may be a linear polarization. Alternatively, the first optical polarization may be a circular polarization. In a certain embodiment, the first optical polarization includes both linear and circular polarization. The first polarizer 220a communicates the polarized first parallax image 120a to the beam combiner 215.

The second polarizer 220b receives the second parallax image 120b from the second parallax optical element 115b and polarizes the second parallax image 120b with a second optical polarization that is different from the first optical polarization. In one embodiment, the second optical polarization is a linear polarization orthogonal to the first optical polarization. Alternatively, the second optical polarization is a circular polarization counter to the first optical polarization. In a certain embodiment, both the linear polarization and the circular polarization of the second optical polarization are different from linear polarization and circular polarization of the first optical polarization.

The beam combiner 215 combines both the polarized first parallax image 120a and the polarized second parallax image 120b into a single parallax image 120. The switchable polarized filter 210 switches between transmitting one of the first optical polarization and the second optical polarization. Thus the switchable polarized filter 210 allows either the polarized first parallax image 120a or the polarized second parallax image 120b to pass to form the synchronized parallax image stream 125 that is communicated to the video camera 105. In one embodiment, the switchable polarized filter 210 is controlled by the controller 140. For example, the controller 140 may provide a binary signal to the switchable polarized filter 210.

Figure 3B:
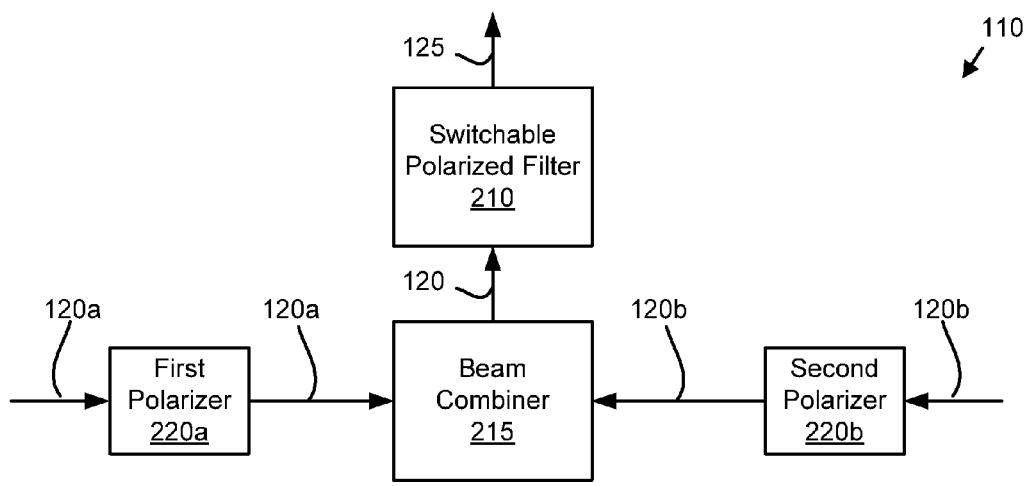
FIG. 3B is a schematic block diagram illustrating one alternate embodiment of a switchable polarized filter optical selector.

FIG. 3B is a schematic block diagram illustrating one alternate embodiment of a switchable polarized filter optical selector 110 of FIG. 3A. In the depicted embodiment, the polarized first parallax image 120a from the first polarizer 220a is directed to the beam combiner 215 from a first direction while the polarized second parallax image 120b is communicated to the beam combiner 215 from an opposite second direction.

The beam combiner 215 redirects both the polarized first parallax image 120a and the polarized second parallax image 120b as combined polarized parallax images 120 to the switchable polarized filter 210. The switchable polarized filter 210 allows either the polarized first parallax image 120a or the polarized second parallax image 120b to pass to form the synchronized parallax image stream 125 that is communicated to the video camera 105.

Figure 4A:
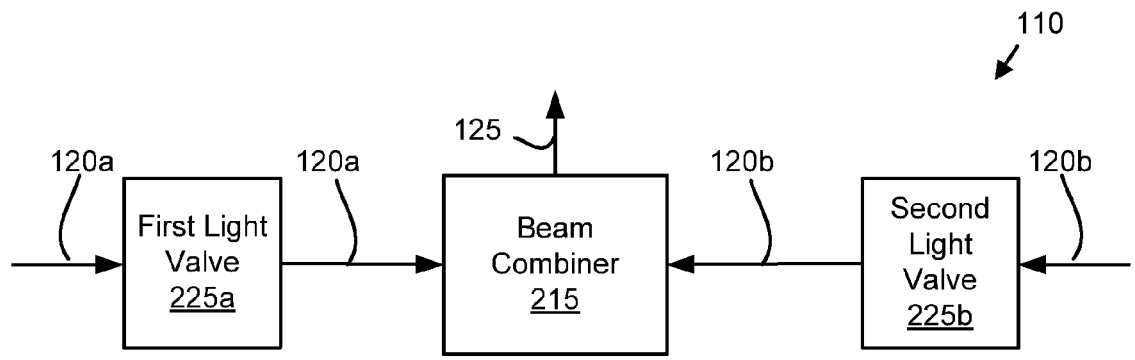
FIG. 4A is a schematic block diagram illustrating one embodiment of a light valve optical selector.

FIG. 4A is a schematic block diagram illustrating one embodiment of a light valve optical selector 110. The light valve optical selector 110 may implement the optical selector 110 of FIGS. 1A-B. In the depicted embodiment, the light valve optical selector 110 includes a first light valve 225a, a second light valve 225b, and the beam combiner 215. Each light valve 225 may be a liquid crystal device that controllably blocks the passage of light. Alternatively, the light valves 225 may be digital micro-mirror devices or grading light valves.

The first light valve 225a receives the first parallax image 120a from the first parallax optical element 115a. Concurrently, the second light valve 225b receives the second parallax image 120b from the second parallax optical element 115b. In one embodiment, one and only one of the first light valve 225a and the second light valve 225b transmits the received parallax image 120 at a time. For example, the first light valve 225a may transmit the first parallax image 120a while the second light valve 225b blocks the second parallax image 120b. In addition, the light valves 225 may alternate transmitting light, with the first light valve 225a blocking the received first parallax image 120a while the second light valve 225b transmits the received second parallax image 120b.

The beam combiner 215 may redirect the transmitted parallax image 120 to form the synchronized parallax image stream 125 that is communicated to the video camera 105. The controller 140 may cause the first light valve 225a to transmit light while the second light valve 225b blocks light or cause the first light valve 225a to block light while the second light valve 225b transmits light.

Figure 4B:
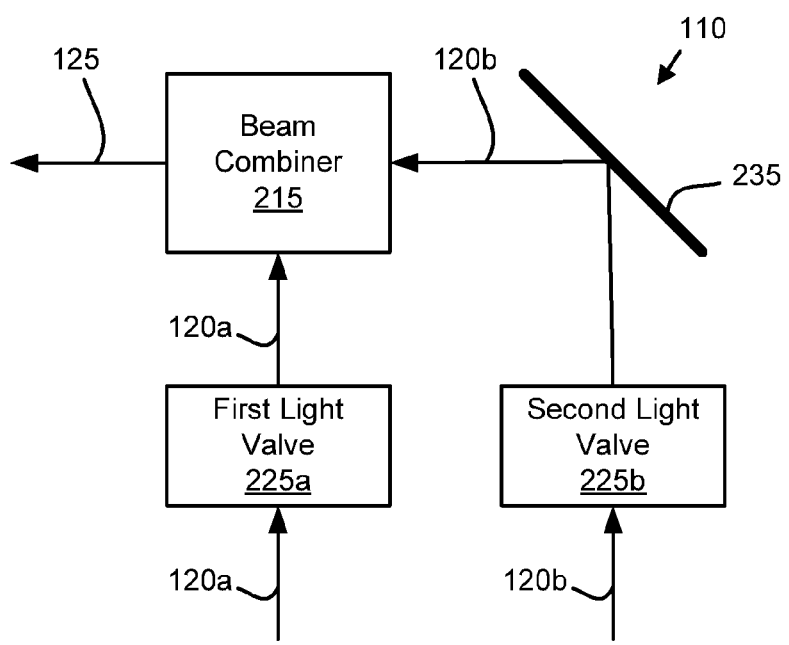
FIG. 4B is a schematic block diagram illustrating one alternate embodiment of a light valve optical selector.

FIG. 4B is a schematic block diagram illustrating one alternate embodiment of the light valve optical selector 110 of FIG. 4A. In the depicted embodiment, the beam combiner 215 redirects the transmitted first parallax image 120a to form the synchronized parallax image stream 125. A mirror 235 redirects the second parallax image 120b to the beam combiner 215 and the beam combiner 215 transmits the second parallax image 120b to form the synchronized parallax image stream 125.

Figure 5:
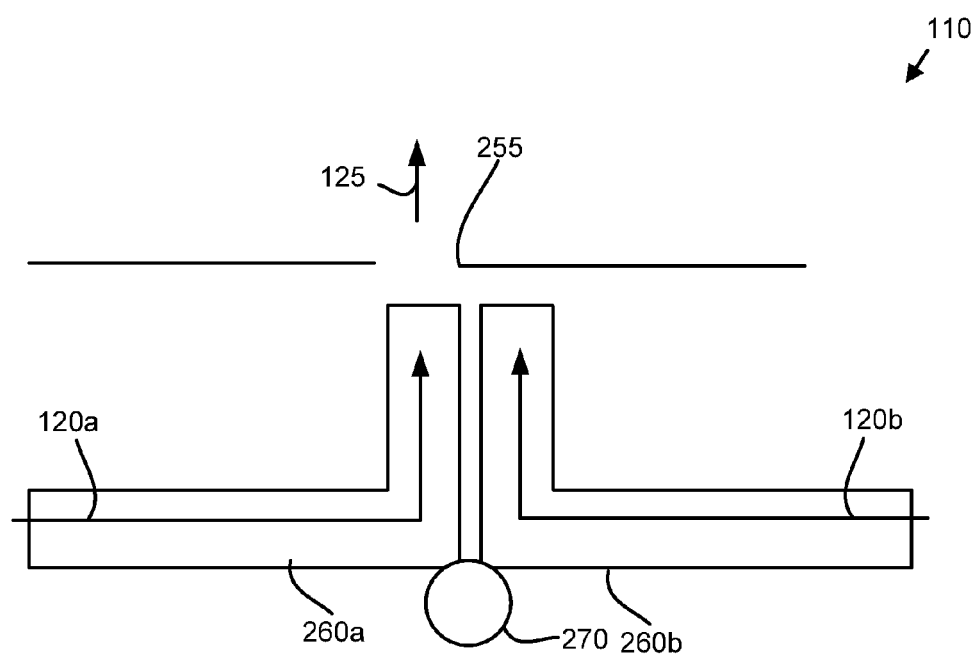
FIG. 5 is a schematic block diagram illustrating one embodiment of a light pipe optical selector.

FIG. 5 is a schematic block diagram illustrating one embodiment of a light pipe optical selector 110. The light pipe optical selector 110 may implement the optical selector 110 of FIGS. 1A-B. The light pipe optical selector 110 includes one or more light pipes 260, an actuator 270, and an aperture 255.

In the depicted embodiment, the light pipes 260 include a first light pipe 260a and a second light pipe 260b. The first light pipe 260a receives the first parallax image 120a from the first parallax optical element 115a while the second light pipe 260b receives the second parallax image 120b from the second parallax optical element 115b.

The actuator 270 positions one and only one of the first light pipe 260a and the second light pipe 260b in optical communication with the aperture 255, and through the aperture 255, in optical communication with the video camera 105. The parallax image 120 from either the first light pipe 260a or the second light pipe 260b passing through the aperture 255 and forms the synchronized parallax image stream 125 that is communicated to the video camera 105.

Figure 6A:
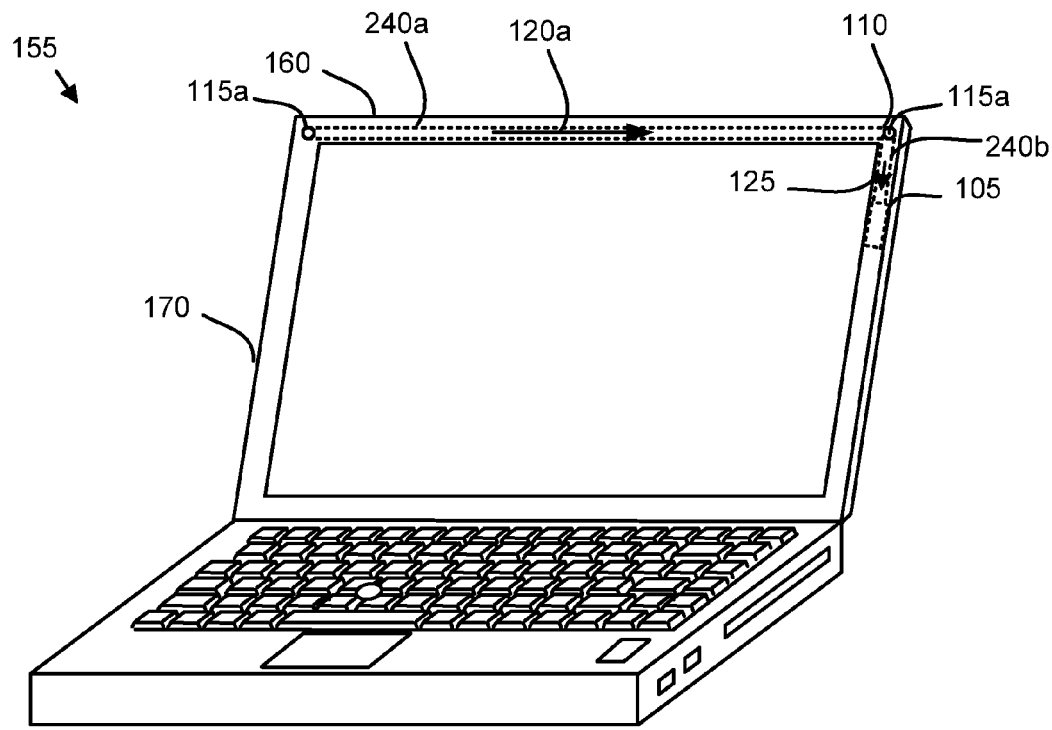
FIG. 6A is a schematic block diagram illustrating one embodiment of an electronic device with optical selector.

FIG. 6A is a schematic block diagram illustrating one embodiment of an electronic device 155 with the optical selector 110. In the depicted embodiment, the electronic device 155 is a laptop computer. One of skill in the art will recognize that the embodiments may be practiced with other electronic devices 155 including but not limited to video cameras, computer workstations, tablet computers, eyeglass computers, and the like.

The first parallax optical element 115a is disposed in a bezel 160 of a display 170 of the electronic device 155. In the depicted embodiment, the first parallax optical element 115a is disposed in the left of the bezel 160. The first parallax optical element 115a receives the first parallax image 120a and redirects the first parallax image 120a through a first air channel 240a to the optical selector 110. The optical selector 110 is depicted is disposed in the right of the bezel 160.

The second parallax optical element 115b is also disposed in the bezel 160 of the display 170. In the depicted embodiment, the second parallax optical element 115b is disposed in the right of the bezel 160 and along the first air channel 240a. The second parallax optical element 115b receives the second parallax image 120b and directs the second parallax image 120b to the optical selector 110. The optical selector 110 alternates between directing the first parallax image 120a and the second parallax image 120b through a second air channel 240b to the video camera 105.

The depicted embodiment supports capturing stereoscopic images with a single video camera 105. In addition, the single video camera 105 may be built into the bezel 160 at a convenient location.

Figure 6B:
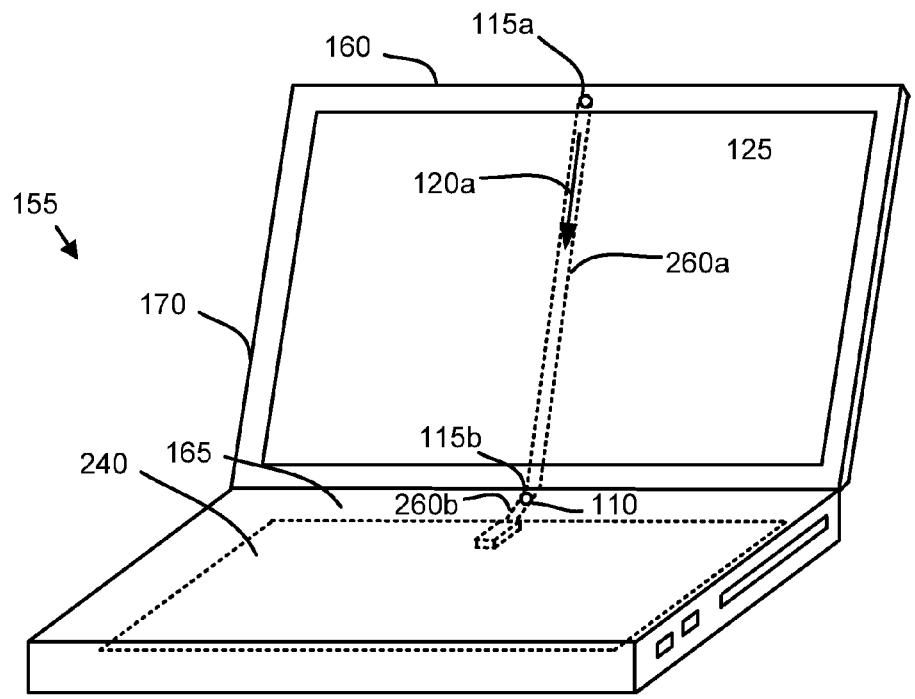
FIG. 6B is a schematic block diagram illustrating one alternate embodiment of an electronic device with optical selector.

FIG. 6B is a schematic block diagram illustrating one alternate embodiment of an electronic device 155 with the optical selector 110. The laptop computer electronic device 155 is shown with the first parallax optical element 115a disposed in a center of the bezel 160 of the display. The first parallax optical element 115a receives the first parallax image 120a and redirects the first parallax image 120a through a first light pipe 260a to the optical selector 110.

The second parallax optical element 115b is depicted disposed on a base 165 of the electronic device 155. The second parallax optical element 115b receives the second parallax image 120b and transmits the second parallax image 120b to the optical selector 110.

The optical selector 110 alternates between directing the first parallax image 120a and the second parallax image 120b through a second light pipe 260b to the video camera 105. In one embodiment, the first and second light pipes 260a-b may be replaced wholly or in part with air spaces.

In the depicted embodiment, the video camera 105 is disposed on a motherboard 240. As a result, no additional power bus and/or data bus is required to connect the video camera 105 to the motherboard 240, further reducing the cost and footprint of the system 100.

Figure 7:
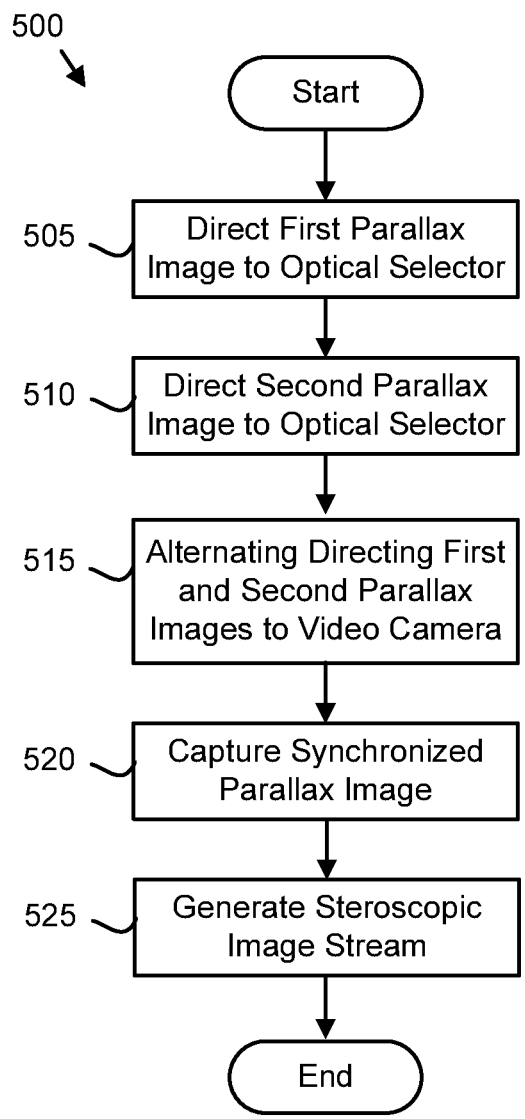
FIG. 7 is a schematic flow chart diagram illustrating one embodiment of an optical selector method.

FIG. 7 is a schematic flow chart diagram illustrating one embodiment of an optical selector method 500. The method 500 may select parallax images 120 to generate the synchronized parallax image stream 125. The method 500 may perform the functions of the optical selector system 100 and the optical selector 110. In addition, portions of the method 500 may be performed by computer readable storage medium storing code that is executed by a processor.

The method 500 starts, and in one embodiment the first parallax optical element 115a directs 505 the first parallax image 120a to the optical selector 110. In addition, the second parallax optical element 115b may direct 510 the second parallax image 120b to the optical selector 110.

The optical selector 110 may alternate between directing 515 the first parallax image 120a and the second parallax image 120b to the video camera 105. In one embodiment, the optical selector 110 is the mirror optical selector 110 of FIGS. 2A-B. The mirror optical selector 110 may alternate between positioning the mirror 205 to reflect the first parallax image 120a to the video camera 105 and positioning the mirror 205 to reflect the second parallax image 120b to the video camera 105.

In an alternative embodiment, the optical selector 110 is the switchable polarized filter optical selector 110 of FIGS. 3A-B. The switchable polarized filter 210 may alternate between transmitting the first optical polarization and the second optical polarization. Because the first parallax image 120a is polarized with the first optical polarization and the second parallax image 120b is polarized with the second optical polarization, the switchable polarized filter 210 thus alternates between transmitting the first parallax image 120a and the second parallax image 120b to generate the synchronized parallax image stream 125.

In one embodiment, the optical selector 110 is the light valve optical selector 110 of FIGS. 4A-B. The light valve optical selector 110 may alternate between transmitting the first parallax image 120a through the first light valve 225a while blocking the second parallax image 120b at the second light valve 225b and transmitting the second parallax image 120b through the second light valve 225b while blocking the first parallax image 120a at the first light valve 225a to generate the synchronized parallax image stream 125.

The optical selector 110 may also be the light pipe optical selector 110 of FIG. 5. The light pipe optical selector 110 may alternate between positioning the first light pipe 260a to transmit the first parallax image 120a through the aperture 255 to optically communicate with the video camera 105 and positioning the second light pipe 260b to transmit the second parallax image 120b through the aperture 255 to communicate with the video camera 105, the parallax images 120 transmitted through the aperture 255 forming the synchronized parallax image stream 125.

The video camera 105 may capture 520 the synchronized parallax image stream 125. In one embodiment, the video camera 105 may generate the stereoscopic image stream 130 from the synchronized parallax image stream 125. The stereoscopic image stream 130 may be a digital video signal. Alternatively, the video camera 105 may generate an analog video signal stereoscopic image stream 130 from the synchronized parallax image stream 125.

In one embodiment, the video camera 105 further generates 525 the processed stereoscopic image stream 135 and the method 500 ends. Alternatively, the post processing module 150 generates 525 the processed stereoscopic image stream 135 from the stereoscopic image stream 130.

Figure 8A:
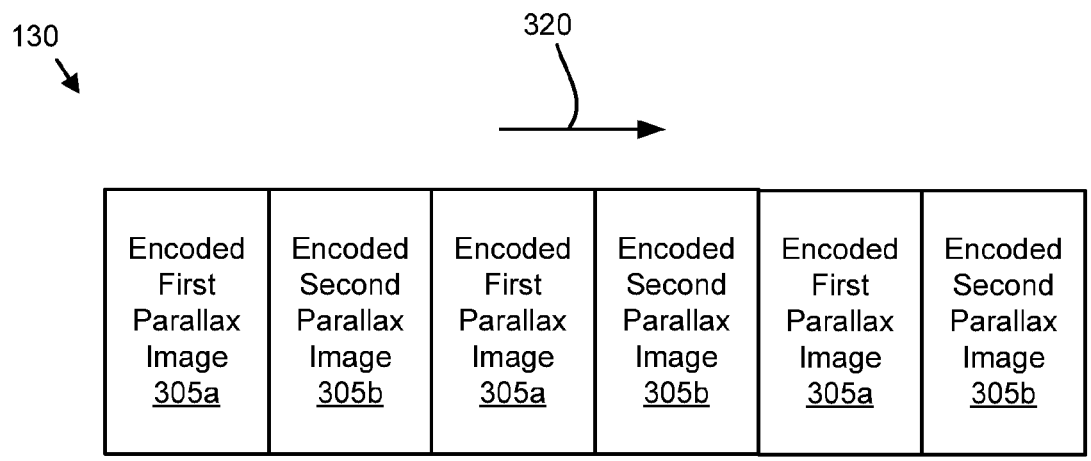
FIG. 8A is a schematic block chart diagram illustrating one embodiment of a stereoscopic image stream.

FIG. 8A is a schematic block chart diagram illustrating one embodiment of the stereoscopic image stream 130. The stereoscopic image stream 130 may be generated by the video camera 105. In the depicted embodiment, the stereoscopic image stream 130 includes alternating encoded first parallax images 305a and encoded second parallax images 305b. Each encoded first parallax image 305a is encoded from a corresponding first parallax image 120a from the synchronized parallax images 125. Each encoded second parallax image 305b is encoded from a corresponding second parallax image 120b from the synchronized parallax images 125. The arrow 320 represents forward time.

The encoded first parallax images 305a and the encoded second parallax images 305b in the stereoscopic image stream 130 are automatically synchronized. Thus no further post processing is required to synchronize the encoded first and second parallax images 305a-b. In one embodiment, the stereoscopic image stream 130 has a frame rate between 24 and 30 encoded first parallax images 305a and encoded second parallax images 305b per second.

Figure 8B:
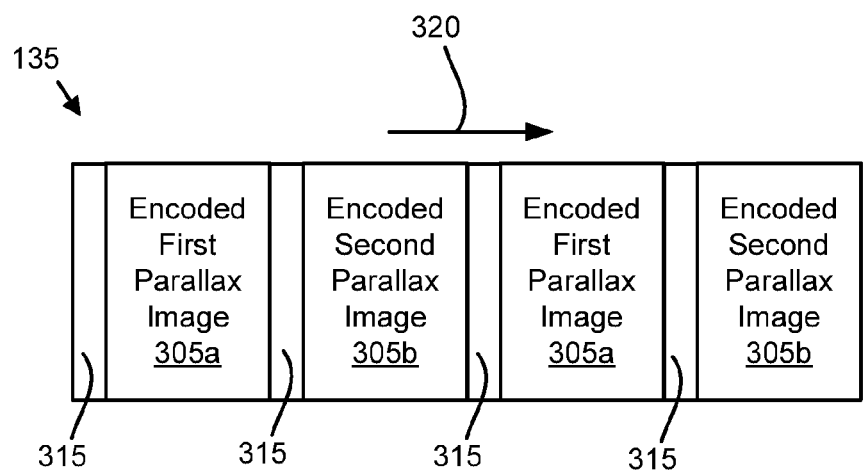
FIG. 8B is a schematic block chart diagram illustrating one embodiment of a processed stereoscopic image stream.

FIG. 8B is a schematic block chart diagram illustrating one alternate embodiment of the processed stereoscopic image stream 135. The processed stereoscopic image stream 135 may be generated from the stereoscopic image stream 130. In one embodiment, the post processing module 150 adds additional metadata 315 to the encoded parallax images 305 to generate the processed stereoscopic image stream 135.

By employing the optical selector 110 to alternate between directing the first parallax image 120a and the second parallax image 120b to the video camera 105, the embodiments generate the stereographic image stream 130 using a single video camera 105. In addition, the encoded first and second parallax images 305 of the stereographic image stream 130 are already synchronized. No further post processing is required to synchronize the encoded first and second parallax images 305.

Because the embodiments may be practiced with only one video camera 105, only a single data bus and power bus need be provided to the single video camera 105. As a result, the volume requirements of the system 100 are simplified and the cost of the system 100 is reduced.

In addition, the video camera 105 may be disposed throughout an electronic device 155 including on the motherboard 240 of the electronic device 155. As a result the stereoscopic image stream 130 may be provided at a significantly lower cost.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
    a video camera;
    a first parallax optical element disposed in a computer display bezel that directs a first parallax image from a first corner of the computer display bezel to an optical selector disposed in the computer display bezel;
    a second parallax optical element disposed in the computer display bezel that directs a second parallax image from a second corner of the computer display bezel to the optical selector disposed in the computer display bezel; and
    the optical selector that alternates between directing the first parallax image and the second parallax image to the video camera.

2. The system of claim 1, wherein the optical selector is a mirror reflecting one of the first parallax image and the second parallax image to the video camera.

3. The system of claim 1, wherein the optical selector is a switchable polarized filter transmitting one of the first parallax image and the second parallax image to the video camera.

4. The system of claim 1, wherein the optical selector comprises at least two light valves transmitting one of the first parallax image and the second parallax image to the video camera.

5. The system of claim 1, wherein the optical selector further positions one of a first light pipe transmitting the first parallax image and a second light pipe transmitting the second parallax image into optical communication with the video camera.

6. The system of claim 1, wherein the first parallax image and the second parallax image are directed through one or more of an air channel, a light pipe, a refractive lens, a mirror, and a flat lens.

7. The system of claim 1, wherein the video camera further captures a synchronized parallax image stream.

8. The system of claim 1, the system further comprising a post processing module that performs a post-processing function.

9. The system of claim 8, wherein the post-processing function separates the first parallax image into a first parallax stream and the second parallax image into a second parallax stream.

10. The system of claim 1, wherein the video camera is disposed on a motherboard.

11. A method comprising:
    directing a first parallax image from a first parallax optical element disposed in a first corner of a computer display bezel to an optical selector disposed in the computer display bezel;
    directing a second parallax image from a second parallax optical element disposed a second corner of the computer display bezel to the optical selector; and
    alternating between directing the first parallax image and the second parallax image from the optical selector to a video camera.

12. The method of claim 11, wherein the optical selector is a mirror reflecting one of the first parallax image and the second parallax image to the video camera.

13. The method of claim 11, wherein the optical selector is a switchable polarized filter transmitting one of the first parallax image and the second parallax image to the video camera.

14. The method of claim 11, wherein the optical selector comprises at least two light valves transmitting one of the first parallax image and the second parallax image to the video camera.

15. The method of claim 11, wherein the optical selector positions one of a first light pipe transmitting the first parallax image and a second light pipe transmitting the second parallax image into optical communication with the video camera.

16. An apparatus comprising:
    an optical selector disposed in a computer display bezel;
    a first parallax optical element disposed in the computer display bezel that directs a first parallax image from a first corner of the computer display bezel to the optical selector;
    a second parallax optical element disposed in the computer display bezel that directs a second parallax image from a second corner of the computer display bezel to the optical selector; and
    wherein the optical selector alternates between directing the first parallax image and the second parallax image to a video camera.

17. The apparatus of claim 16, wherein the optical selector is a mirror reflecting one of the first parallax image and the second parallax image to the video camera.

18. The apparatus of claim 16, wherein the optical selector is a switchable polarized filter transmitting one of the first parallax image and the second parallax image to the video camera.

19. The apparatus of claim 16, wherein the optical selector comprises at least two light valves transmitting one of the first parallax image and the second parallax image to the video camera.

20. The apparatus of claim 16, wherein the optical selector further positions one of a first light pipe transmitting the first parallax image and a second light pipe transmitting the second parallax image into optical communication with the video camera.

* * * * *